(12) United States Patent
McIntosh et al.

(10) Patent No.: US 12,146,650 B2
(45) Date of Patent: Nov. 19, 2024

(54) PROJECTORS FOR OVERHEAD HAZARD WARNING SYSTEMS

(71) Applicants: David McIntosh, North Vancouver (CA); Steve M. Smith, Vancouver (CA)

(72) Inventors: David McIntosh, North Vancouver (CA); Steve M. Smith, Vancouver (CA)

(*) Notice: Subject to any disclaimer, the term of this patent is extended or adjusted under 35 U.S.C. 154(b) by 0 days.

(21) Appl. No.: 17/170,509

(22) Filed: Feb. 8, 2021

(65) Prior Publication Data

US 2021/0247063 A1    Aug. 12, 2021

Related U.S. Application Data

(60) Provisional application No. 62/971,827, filed on Feb. 7, 2020.

(51) Int. Cl.
| | |
|---|---|
| *F21V 33/00* | (2006.01) |
| *B66F 17/00* | (2006.01) |
| *F21S 9/02* | (2006.01) |
| *F21V 9/08* | (2018.01) |
| *F21V 29/58* | (2015.01) |
| *F21V 29/77* | (2015.01) |
| *G08B 5/36* | (2006.01) |
| *F21W 131/10* | (2006.01) |

(52) U.S. Cl.
CPC ........ *F21V 33/0076* (2013.01); *B66F 17/006* (2013.01); *F21S 9/02* (2013.01); *F21V 9/08* (2013.01); *F21V 29/58* (2015.01); *F21V 29/773* (2015.01); *G08B 5/36* (2013.01); *F21W 2131/1005* (2013.01)

(58) Field of Classification Search
CPC .......... F21V 29/51; F21V 29/74; F21V 33/00; F21V 9/08; F21V 29/77; F21V 29/58; F16P 3/144
See application file for complete search history.

(56) References Cited

U.S. PATENT DOCUMENTS

| | | | |
|---|---|---|---|
| 4,712,167 A | 12/1987 | Gordin et al. | |
| 5,207,747 A | 5/1993 | Gordin et al. | |
| 5,572,202 A | 11/1996 | Regel et al. | |
| 5,734,339 A | 3/1998 | Ogle | |
| 6,208,260 B1 | 3/2001 | West et al. | |
| D565,080 S | 3/2008 | Ishikawa | |
| D565,081 S | 3/2008 | Ishikawa | |
| 7,494,249 B2 * | 2/2009 | Li | F21V 29/717 |
| | | | 362/345 |
| 7,914,184 B2 * | 3/2011 | Liu | F21V 29/83 |
| | | | 362/373 |

(Continued)

FOREIGN PATENT DOCUMENTS

EP          0367034 B1    5/1994

*Primary Examiner* — William J Carter
(74) *Attorney, Agent, or Firm* — Oyen Wiggs Green & Mutala LLP; Nicholas Garner

(57) ABSTRACT

An overhead hazard warning for an elevated work platform comprises a light source configured to emit light in a downward direction. The light passes through a first optical lens assembly, a template, and a second optical lens assembly to produce a pattern below the elevated work platform. A heat sink is located above the light source to draw heat radiated by the light source upwards and away from the light source.

20 Claims, 3 Drawing Sheets

(56) References Cited

U.S. PATENT DOCUMENTS

| | | | |
|---|---|---|---|
| 9,336,660 B2* | 5/2016 | McIntosh | B66F 17/006 |
| D827,693 S | 9/2018 | Shibuya et al. | |
| D828,864 S | 9/2018 | Shibuya et al. | |
| 2005/0259150 A1 | 11/2005 | Furumi et al. | |
| 2008/0048880 A1 | 2/2008 | Strickland et al. | |
| 2008/0055105 A1 | 3/2008 | Blum et al. | |
| 2008/0117637 A1* | 5/2008 | Chang | F21V 29/717 |
| | | | 165/182 |
| 2009/0147519 A1* | 6/2009 | Klipstein | F21L 14/023 |
| | | | 362/249.02 |
| 2014/0204347 A1* | 7/2014 | Murphy | G03B 21/2033 |
| | | | 353/57 |
| 2016/0011495 A1 | 1/2016 | Takagi et al. | |
| 2016/0191877 A1 | 6/2016 | Ono | |
| 2016/0286186 A1 | 9/2016 | Fujiune | |
| 2019/0302453 A1 | 10/2019 | Oshima | |
| 2021/0187537 A1 | 6/2021 | Salazar et al. | |

\* cited by examiner

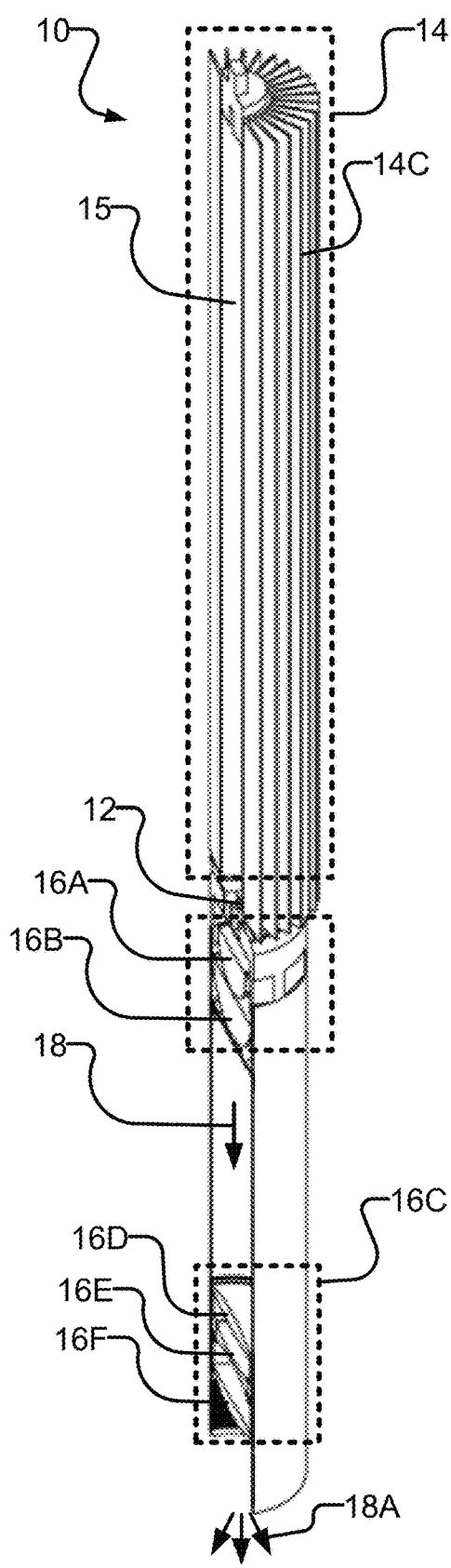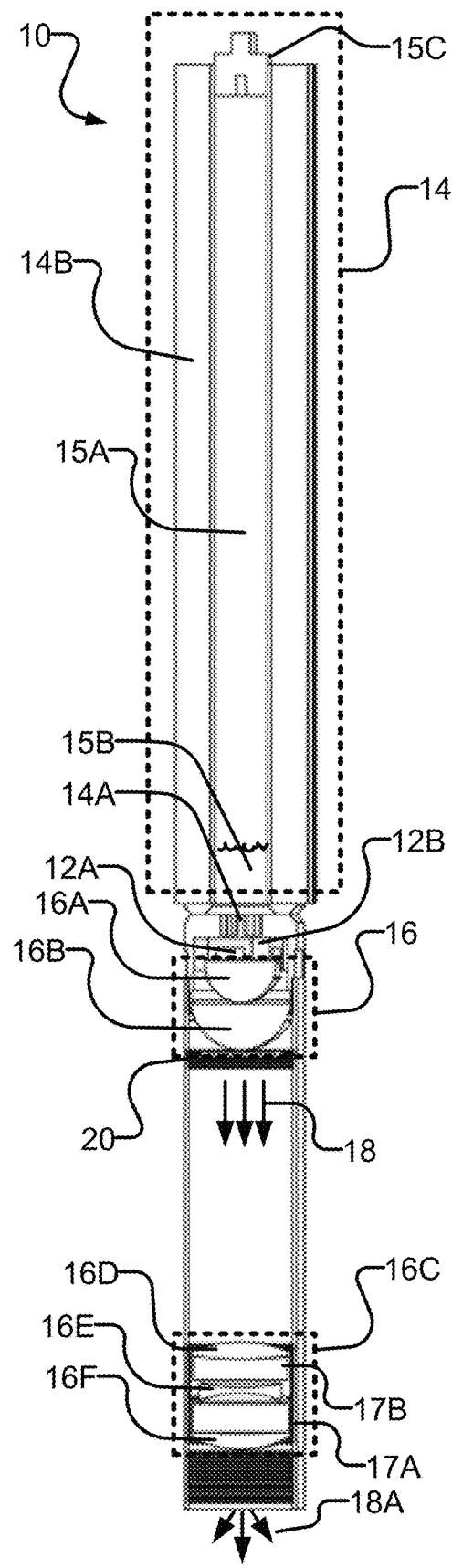
Fig. 1  Fig. 1A

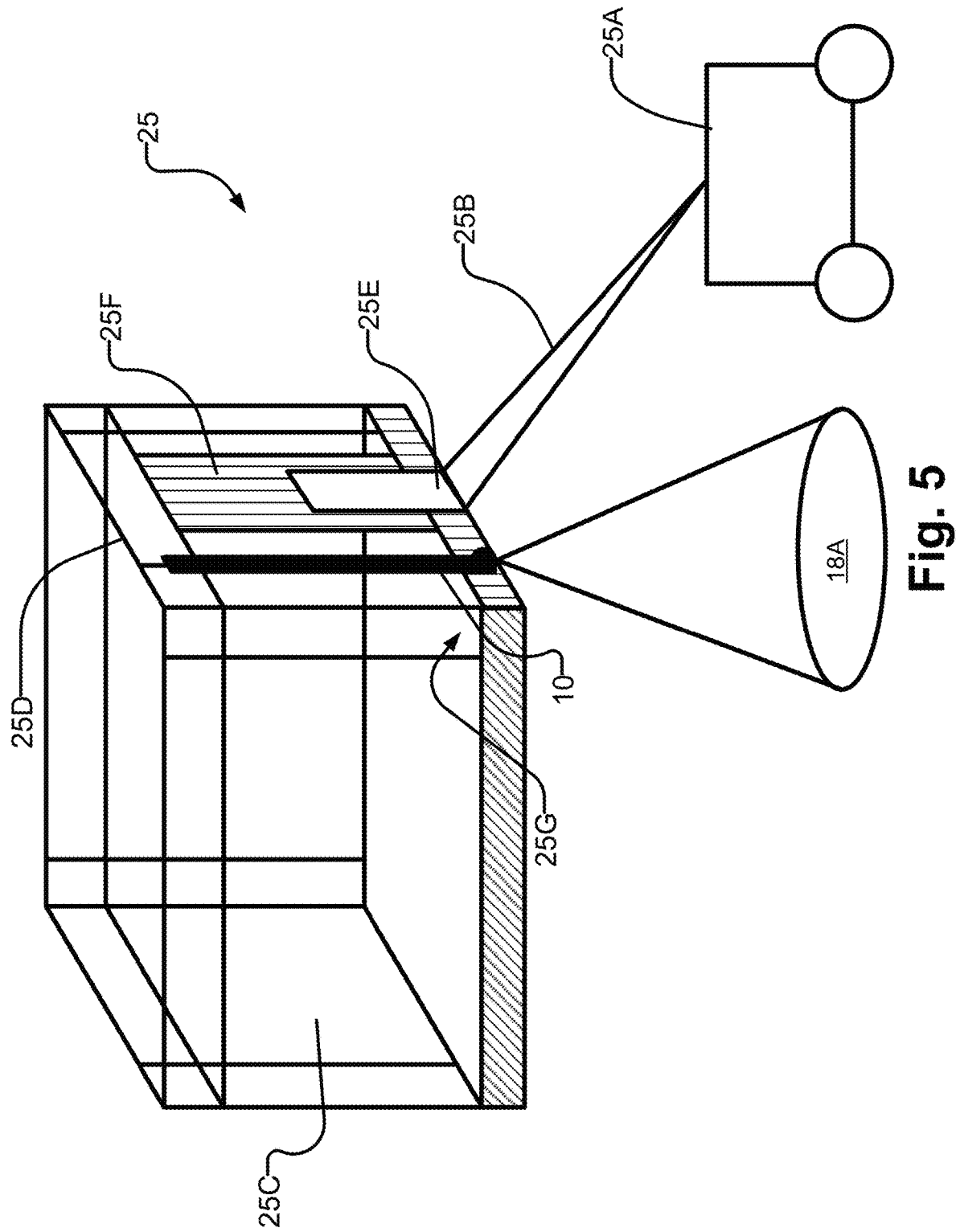

PROJECTORS FOR OVERHEAD HAZARD WARNING SYSTEMS

CROSS-REFERENCE TO RELATED APPLICATION

This application claims priority from U.S. application No. 62/971,827 filed 7 Feb. 2020 and entitled PROJECTORS FOR OVERHEAD HAZARD WARNING SYSTEMS which is hereby incorporated herein by reference for all purposes. For purposes of the United States of America, this application claims the benefit under 35 U.S.C. § 119 of U.S. application No. 62/971,827 filed 7 Feb. 2020 and entitled PROJECTORS FOR OVERHEAD HAZARD WARNING SYSTEMS.

FIELD

The invention relates generally to projectors suitable for use in overhead hazard warning systems. Such systems have example application to warn others that personnel are working overhead. The projectors may also have application for other uses.

BACKGROUND

In many industries, such as, for example, construction, manufacturing, warehousing and film production, there are cases where personnel may be working in elevated work platforms supported by cranes, lifts, booms, hoists, or other devices. In such cases the possibility that objects will be dropped from the elevated work platform presents a hazard to persons on the ground under the elevated work platform. Such persons may sustain injuries if they are hit by a tool or other object that is dropped from the elevated work platform. This can be particularly dangerous in settings where the persons below are not wearing hard hats.

U.S. Pat. No. 9,336,660 describes an overhead warning system.

There is a need for projectors that are well adapted for use in overhead warning systems and overhead warning systems that incorporate such projectors.

SUMMARY

This invention has a number of aspects. These include:
projectors which incorporate one or more novel features and/or feature combinations as described herein;
overhead warning systems which incorporate such projectors; and
methods for operating overhead warning systems.

One aspect of the invention provides an overhead hazard warning system usable with an elevated work platform. The overhead hazard warning system comprises a light source configured to emit light in a downward direction, the light passing through a first optical lens assembly, a template, and a second optical lens assembly to produce a pattern below the elevated work platform and a heat sink located above the light source. The heat sink comprises a cavity located inside a radiating structure. The cavity is elongated in the downward direction. The cavity contains a depressurized fluid in thermal contact with the light source to draw heat radiated by the light source upwards to distribute the heat along the radiating structure.

In some embodiments the radiating structure and the cavity are concentric.

In some embodiments the radiating structure comprises fins spread around the circumference of the radiating structure.

In some embodiments the template is substitutable to allow the system to produce different patterns.

In some embodiments the first optical lens assembly is configured to direct the light downward in a collimated beam.

In some embodiments the second optical lens assembly is configured to project the collimated beam downward in a diverging beam.

In some embodiments the depressurized fluid has a boiling point that is above 30 Celsius and below 70 Celsius. For example, the depressurized fluid may be distilled water. In some embodiments the pressure of the cavity is set to a vacuum of about 35 Torr such that the boiling point of the depressurized fluid is above approximately 30 to 40 Celsius (e.g. in the range of 30 to 50 Celsius).

In some embodiments the heat sink comprises a thermally conductive post that extends longitudinally along the cavity wherein one or more portions of the post are in thermal contact with the light source and one or more portions of the post are in contact with the depressurized fluid.

In some embodiments the light source is contained within a tubular housing in a projector attached to a basket of an elevated work platform and the projector is oriented generally perpendicular to a floor of the basket.

In some embodiments the projector is attached to a railing of the basket on the side of the basket to which a boom of the elevated work platform is coupled.

In some embodiments the projector does not exceed 1 m in length, a top end of the projector is below a top of the railing of the basket and a bottom end of the projector is above a bottom of the basket.

In some embodiments the projector is attached on an outside of the basket railing.

In some embodiments the projector has a diameter of 15 cm or less (e.g. a diameter in the range of 6 cm to 10 cm.

In some embodiments the overhead hazard warning system comprises a control system connected to supply electrical power to the light source and the control system is configured to perform any combination of two or more of:
power the light source on or off in response to user input;
cause an intensity of light from the light source to fluctuate;
vary the brightness of light from the light source in response to changes of ambient light levels;
power the light source off if a set period of time passes from the powering on of the light source,
power the light source off if a set period of time passes from motion being detected in the basket of the boom lift and/or an occupancy sensor indicating that there are no personnel in the basket of the boom lift;
power the light source off in response to a wireless signal; and
monitor the operation of the overhead hazard warning system and power off the light source or generate an alarm signal if the overhead hazard warning system is not working properly.

In some embodiments the overhead hazard warning system comprises one or more connectors configured to connect to standard power tool external batteries wherein the light source is connected to be powered from the standard power tool external batteries. The standard power tool batteries may, for example, be mass produced batteries for commonly available portable power tools such as battery powered drills and impact drivers. In some embodiments the external batteries have output voltages of at least 18 volts and capacities of at least 5 ampere hours.

In some embodiments the light source emits light that is primarily one of yellow, orange or red in colour.

In some embodiments the template comprises a yellow, orange or red color filter.

In some embodiments the light source comprises a flashing or pulsating light source.

In some embodiments the light source comprises a shutter operative to block light from being projected from the light source.

Another aspect of the invention provides an overhead hazard warning system comprising a projector attached to a railing of a basket of an elevated work platform such as a boom lift. The projector is located below a top edge of a railing of the basket and above a bottom of the basket. The projector is dimensioned to fit within a cylindrical space having a diameter of 15 cm and a length of 1 meter. The projector is operable to project light in a downward direction. The projector comprises: a light source operable to emit light to passing through optics that include a template carrying a pattern and lenses that project a beam of light imprinted with the pattern downwardly from the boom lift basket and a heat sink located above the light source. The heat sink comprises: a thermally conductive member that is in thermal contact with the light source; a heat radiating structuring comprising one or more thermally conductive fins for dissipate heat; and a heat conducting structure operative to carry heat away from the thermally conductive member and distribute the heat over an inner surface of the heat radiating structure. The heat conducting structure comprises a sealed cavity that holds a heat transfer liquid that is in contact with the thermally conductive member wherein the cavity is partially evacuated to a pressure at which a boiling point of the heat transfer liquid is below 70 Celsius and above 30 Celsius. A straight sealed tubular housing contains the light source and the optics. The optics are configured to collimate light from the light source, pass the collimated light through the template, and cause the light that has passed through the template to diverge to form the beam of light.

In some embodiments the template is substitutable to allow the system to produce different patterns.

In some embodiments the template comprises a spatial light modulator configurable to change the pattern to a different pattern.

In some embodiments the pattern projected by the template includes one or more of: a written warning message that includes one or more of the word CAUTION or WORKERS ABOVE or DANGER or HAZARD and a graphical warning symbol.

Further aspects and example embodiments are illustrated in the accompanying drawings and/or described in the following description.

It is emphasized that the invention relates to all combinations features described herein even if these are shown in different drawings, described in different paragraphs or sections of the description and/or recited in different claims.

BRIEF DESCRIPTION OF THE DRAWINGS

The accompanying drawings illustrate non-limiting example embodiments of the invention.

FIG. 1 is a perspective cross section view of a projector according to an example embodiment. FIG. 1A is a side cross section view of the projector of FIG. 1.

FIG. 5 is a schematic illustration showing the projector of FIG. 1 attached to a basket of a boom lift.

DETAILED DESCRIPTION

Figure 2:
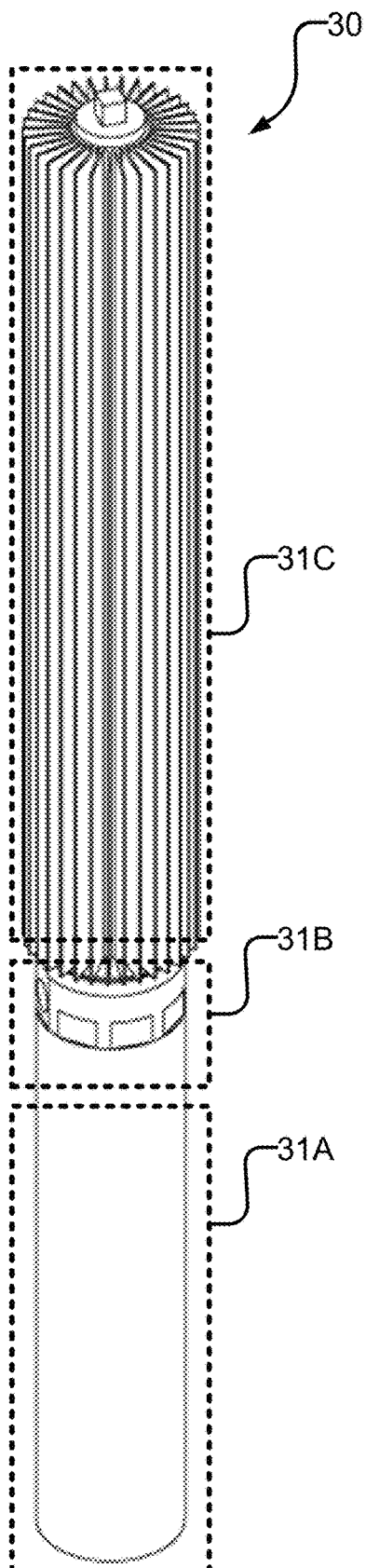
FIG. 2 is a side elevation view of the projector of FIG. 1.
Figure 3:
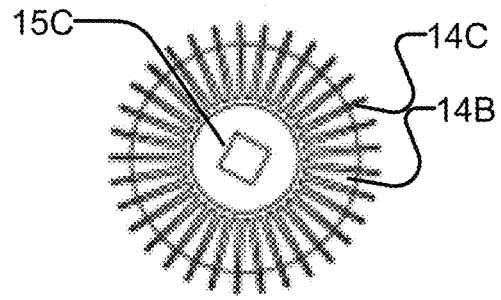
FIG. 3 is a top plan view of the projector of FIG. 1.
Figure 4:
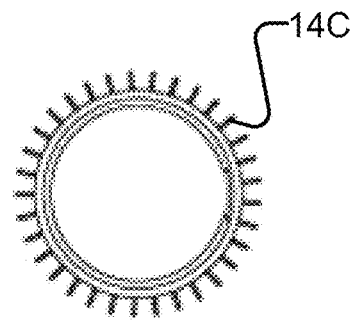
FIG. 4 is a bottom plan view of the projector of FIG. 1.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

FIG. 1 is a cross section view of a projector 10 according to an example embodiment. Projector 10 is designed to be oriented to project a pattern of light downwardly. For example, projector 10 may be mounted to an elevated platform and may be operated to project a pattern of light onto the ground below the elevated platform to warn persons below the elevated platform of the hazard of objects falling from above.

Projector 10 includes a light source 12. Light source 12 preferably comprises a solid state light source such as a light emitting diode (LED) light source. Light source 12 is operable to emit sufficient light to produce a prominent pattern of light on the ground that can serve as a warning to passing persons. In some embodiments, light source 12 has a light output of at least 10000 lumens. In some embodiments, light source 12 has a light output of at least 15000 lumens or at least 20000 lumens. In some embodiments light source 12 comprises a LED light source that draws at least 100 Watts of electrical power (e.g. 150 Watts).

In the illustrated embodiment, light source 12 comprises a LED chip 12A mounted to a holder 12B.

A heat sink assembly 14 is provided to draw heat away from light source 12. Heat sink assembly 14 comprises a thermally conductive post 14A that is in thermal contact with a top side of light source 12, heat radiating structure 14B comprising fins 14C, and a heat conducting structure 15 that carries heat from thermally conductive post 14A and distributes the heat along heat radiating structure 14B to allow the heat to be dissipated by fins 14C.

Heat radiating structure 14B may have a wide range of configurations. For example, the tips of fins 14C may lie along a circular envelope as illustrated but the envelope could be square, rectangular or elliptical instead. Different fins 14C may have different radial lengths and/or may be interrupted in the vertical direction.

In the illustrated embodiment heat conducting structure 15 comprises a sealed cavity 15A inside heat radiating structure 14B. Cavity 15A contains a quantity of a heat transfer liquid 15B. The heat transfer liquid may, for example, comprise or consist of distilled water. In some embodiments, heat transfer liquid 15B occupies about 2½% (1/40$^{th}$) of the total volume of cavity 15A. In some embodiments, the total volume of heat transfer liquid 15B is about 20 ml.

The heat transfer liquid is preferably in contact with thermally conductive post 14A. The end of thermally conductive post 14A that is in contact with the heat transfer liquid may be flat or may be shaped to increase the surface area in contact with the heat transfer liquid, for example by shaping the end of post 14A in a bowl like configuration and/or forming grooves or ridges on the end of thermally conductive post 14.

The heat transfer liquid preferably has a boiling point that is within a safe operating temperature range for light source 12. For example, if light source 12 has a maximum safe operating temperature of 60 Celsius, the heat transfer liquid may have a boiling point that is less than 60 Celsius, for example, in the range of 25 to 40 Celsius. The boiling point of the heat transfer liquid is preferably above the ambient temperature.

A pressure within cavity 15A may be reduced such that a boiling point of the heat transfer liquid 15B is reduced. In an example embodiment the pressure within cavity 15A is reduced below atmospheric pressure to the point that the boiling point of heat transfer liquid 15B is less than about 60 Celsius.

In some embodiments the boiling point of heat transfer liquid 15B at a pressure of 1 atmosphere is in the range of 70 Celsius to 130 Celsius and the pressure in cavity 12A is reduced to a level such that the heat transfer liquid boils at a temperature of less than 70 Celsius (e.g. 30 to 50 Celsius).

For example, where heat transfer liquid 15B is distilled water (boiling point at 1 atmosphere 100 Celsius), the pressure within cavity 15A may be reduced to a vacuum of about 35 Torr such that the boiling point of the distilled water is just above expected ambient temperatures (e.g. approximately 30 to 40 Celsius). For example, the boiling point of heat transfer liquid 15B may be below 50 Celsius or below 45 Celsius or below 40 Celsius.

In some embodiments, the pressure within cavity 15A is reduced by drawing air out of cavity 15A and inserting a plug 15C to seal cavity 15A. Plug 15C is inserted and sealed while cavity 15A is under vacuum pressure. Plug 15C may be made of a suitable material such as Aluminum. In some embodiments plug 15C is welded in place such that a weld seals ambient air out of cavity 15A and keeps the heat transfer liquid in cavity 15A.

Heat conducting structure 15 may operate as a heat pipe that carries heat away from light source 12 to heat radiating structure 14B with very low thermal resistance. A pool of the heat transfer liquid is at the bottom of cavity 15A in contact with thermally conductive post 14A. Heat from operation of light source 12 may cause the heat transfer liquid to boil in cavity 15A. Vapour of the heat transfer liquid fills the remainder of cavity 15A and condenses on walls of cavity 15A. Heat radiating structure 14B carries away the heat of condensation and dissipates that heat by any combination of convection and radiation. The condensed vapour (once again in the liquid phase) is urged downward back to the bottom of cavity 15A by gravity.

A first optical assembly 16 which, in the illustrated example, comprises first and second lenses 16A and 16B captures light emitted by light source 12 and directs the light downward in a collimated beam 18. Beam 18 passes through a template 20 (discussed below) to a second optical assembly 16C that projects beam 18 downwardly in a slightly diverging beam 18A. Beam 18 projects a pattern onto the ground below projector 10. In the illustrated embodiment, optical assembly 16C includes lenses 16D, 16E and 16F which are positioned by a suitable arrangement of lens holders 17A and spacers 17B.

The angle of divergence of beam 18A may, for example, be in the range of about 4 degrees to about 8 degrees relative to vertical. In some embodiments the angle of divergence of beam 18 is such that an area on the ground illuminated by projector 10 is in the range of about 2 m across to about 4 m across when projector 10 is in the range of 3 m to 24 m above the ground. An illuminated area of approximately 3 m across may provide a good balance of brightness of the image projected on to the ground and visability to personnel walking on the ground.

Template 20 imprints an image on light beam 18 such that the image is projected onto the ground below projector 10. Template 20 may, for example, comprise a GOBO, a stencil, a slide, a spatial light modulator, or the like.

Template 20 may be one of a plurality of interchangeable templates 20 that allows the image projected by projector 10 to be customized for different applications (e.g. different templates 20 may include warnings in different languages and/or different graphical features that indicate hazards in different cultures or regions).

The projected image may, for example, include a written message (such as CAUTION or WORKERS ABOVE or DANGER or HAZARD) and/or a graphical warning symbol such as the outline of a warning sign (e.g. a yellow diamond shape). Words may optionally be arranged around a circular path concentric with light beam 18 so that they can be read by people approaching the pattern of light projected by projector 10 from different directions.

The image projected by projector 18 may be a colour image and may include colours customarily associated with warning messages such as yellow or orange or red. In some embodiments, to improve the efficiency of projector 10, light source 12 may be of a type that emits light that is primarily yellow or primarily orange or primarily red. In such cases template 20 may be configured to block light from areas where the light is not required and to pass light in other areas where the light is required (e.g. in such cases template 20 may not include colour filters).

In some embodiments the projected image changes dynamically. For example:

- The projected image may flash or pulsate in brightness (this may be achieved, for example by controlling the brightness of light source 12 and/or operating a shutter (not shown).
- The projected image may rotate (this may be achieved for example by mounting template 14 to rotate and driving rotation of template 14 with a small motor (not shown).
- The projected image may alternate between different projected images (this may be achieved, for example, by mounting template 14 on a stage that comprises two or more different templates 14 and moving the stage with an actuator so that different ones of the templates 14 carried by the stage are in the illumination path of projector 10).
- The projected image may be changed dynamically in any of a wide variety of other ways by using an electronically controllable light modulator such as an LCD panel or the like for template 14.

Advantageously projector 10 is small in cross section and suitably short to allow it to be attached to an elevated platform without impeding operation of the platform. For example, in some embodiments, projector 10 has an overall form factor of an elongated cylinder. Projector 10 may, for example, comprise a body made of a number of coupled together tubular sections.

FIG. 2 shows an example in which projector 10 comprises a housing 30 comprising a tubular section 31A that serves as a focal tube, a tubular section 31B that houses light source 12 and first optical assembly 16. Tubular sections 31A and 31B may be separated to access template 20. A third tubular section 31C is connected to second tubular section 31B and encloses heat conducting structure 15. Housing 30 may be sealed to prevent ingress of dust or moisture.

In some embodiments projector 10 has an overall length that does not exceed about 1 meter. Since safety railings on elevated platforms are often required to be at least about 36 inches high, making projector 10 have an overall length that is less than the required railing height allows projector 10 to be mounted outside of the railing without projecting above the top of the railing or projecting below a level of a deck of an elevated platform on which the railing is mounted (e.g. see FIG. 5).

In some embodiments the length of tubular section 31C enclosing heat conducting structure 15 is longer than the length of tubular section 31B housing light source 12. In some embodiments the length of tubular section 31C is longer than the length of tubular section 31A (the section of projector 10 serving as the focal tube). In some embodiments, the length of tubular section 31C is longer than the combined lengths of tubular section 31B and 31A.

In some embodiments, the length of cavity 15A is longer than the distance between lens assembly 16A and lens assembly 16B.

In some embodiments the body of projector 10 is 15 cm or less in diameter and is preferably about 6 to 10 cm in diameter. This allows projector 10 to, for example, be mounted to or adjacent to a railing of a basket of a boom lift without projecting outwardly so much that it interferes with safe operation of the boom lift.

For example, projector 10 may be mounted on the back side of a basket (the side on which a boom attaches to the basket) of a boom lift. FIG. 5 shows an example boom lift 25 comprising a mobile base 25A, a boom 25B and a basket 25C surrounded by a railing 25D. Boom 25B couples to basket 25C at a location 25E near the center of a back side 25F of basket 25C. A projector 10 is mounted to railing 25D on back side 25F between location 25E and a rear corner 25G of basket 25C. This is an advantageous location to mount projector 10 because from this location projector 10 can have a good view of the ground, projector 10 is protected from being damaged in the case that the front or sides of the basket come into contact with a structure and projector 10 is out of the way of work being done from the basket in most cases. Making projector 10 small in diameter allows projector 10 to be positioned generally as shown in FIG. 5 without presenting a pinch hazard or interfering with any possible motions of the boom lift.

Projector 10 may be mounted to a railing or other structure in any of various ways including clamping projector 10 to a vertical bar of the railing structure. In some embodiments projector 10 includes a mounting plate which is part of or attached to housing 30. The mounting plate may comprise holes, clamps, hooks, or the like that facilitate attachment of projector 10 to an elevated platform.

In an alternative embodiment a projector 10 is mounted inside a railing of an elevated platform and a hole is provided in a deck of the platform to allow light from projector 10 to be projected onto the ground. The end of projector 10 projects through the hole in the deck in some embodiments.

In some embodiments, projector 10 includes a quick attach system that allows projector 10 to be rapidly detached from basket 25C. The quick attach system may comprise suitable fasteners which are releasable to decouple projector 10 from basket 25C. A quick attach system can advantageously allow a single projector 10 to be easily switched between multiple boom lifts 25.

Projector 10 includes a control system that supplies electrical power to drive light source 12. The control system may be in or on housing 30 or may be housed in an enclosure separate from housing 30 and connected to control light source 12 in a suitable manner. The control system may be configured to provide various functions which may include some or any combination of two or more of:

- In response to user input turning light source 12 ON or OFF.
- Causing the intensity of light source 12 to fluctuate (e.g. to flicker, pulsate, flash, or the like) so that the projected light is made more noticeable.
- Automatically control brightness of light source 12 in response to an ambient light level detected by a light sensor. For example, when the ambient lighting is very low, the intensity of light source 12 may be reduced and when the ambient lighting is bright, the intensity of light source 12 may be increased.
- Automatically turn light source OFF or to a low intensity level to conserve power after light source 12 has been ON for a set period of time and/or after a vibration sensor senses no motions for a period of time (indicating that no personnel are in the associated elevated platform) and/or when an occupancy sensor indicates that no personnel are in the associated elevated platform. The control system may display a signal such as a flashing indicator light, a sound alert or the like to indicate that light source 12 has been automatically turned OFF or to a low intensity level.
- In response to receiving a wireless signal turn light source 12 OFF (this feature may be used, for example to simultaneously turn all projectors 10 on a film set OFF when filming commences).
- Monitor operation of projector 10 and take an action such as one or more of cut power to light source 12 and/or generate an alarm signal if projector 10 is not working properly. The monitoring may, for example, comprise one or more of: monitoring a light sensor located to detect light from light source 12 and performing the action if no light is detected when light source 12 is being controlled to be ON; monitoring a temperature of light source 12 with a temperature sensor and performing the action if the temperature exceeds a threshold; monitoring an electrical current being drawn by light source 12 and performing the action if the current is outside an expected range for the current state of operation (e.g. ON or OFF or ON at a reduced power level) of light source 12.

Electrical power for projector 10 may be provided in various ways. In some embodiments an elevated platform includes a source of electrical power (for example, a boom lift may comprise an onboard battery or electrical generator wired to provide electrical power to an elevated platform of the boom lift). In such cases that source of electrical power may be used to supply power to projector 10. In another example, a control system for projector 10 may include a rechargeable battery pack. In another embodiment, a control system for projector 10 includes connectors for connecting to external batteries. In one example, the external batteries may be of the type used to power portable hand tools. For example, the batteries may be lithium ion batteries having voltages of 18 or 20 volts and capacities of 5 to 6 ampere hours. For example, the batteries may be batteries compatible with portable power tools made by a company such as Milwaukee™, Dewalt™, Panasonic™, Porter Cable™, Bosch™, Ryobi™ or Makita™. The connectors may be of the same design as connectors on compatible power tools. In some embodiments projector 10 includes couplings for receiving two such batteries.

The above power supply arrangements may be combined. A controller of projector 10 may automatically switch between different power supplies. For example if external power is available the controller may power light source 12 from the external power and/or the controller may include a charger that charges internal batteries using the external power.

A projector 10 as described herein can have many advantages in the context described above. For example, such a projector may have one or more of the following advantages:

- The projector 10 can be sealed against the environment so that it can be left attached to an elevated platform that is stored outside without harm.
- All lenses face downward and can be recessed within housing 30 of projector 10. In this location the outermost lens or window through which beam 18A issues is protected from rain dust etc.
- The projector 10 may be dimensioned to allow it to be affixed easily to an elevated platform in a location that allows effective operation of projector 10 to project a warning pattern onto the ground while not interfering with operation or use of the elevated platform.
- The projector 10 may generate a very bright and noticeable projected image with relatively little electrical power.
- The vertical orientation of projector 10 with heat sink assembly 14 directly above light source 12 facilitates effective thermal management of light source 12.
- The vertical orientation of heat sink assembly 14 facilitates operation of heat conducting assembly 14B as a heat pipe.

While projector 10 is well adapted for projecting warning patterns in overhead hazard warning applications a projector 10 as described within may be applied in other applications where a projector is desired. In cases where it is desired to emit light in a direction that is not vertical a projector as described herein may be modified to be bent at a connection between heat sink assembly 14 and the rest of the projector 10. An angle of the bend may be selected to allow heat sink assembly to be oriented vertically while optical elements of the projector 10 are oriented to direct light at a desired angle relative to vertical.

Interpretation of Terms

Unless the context clearly requires otherwise, throughout the description and the claims:
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

A controller for a projector 10 may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, general purpose computers and the like. For example, one or more data processors in a control circuit for a device may implement methods as described herein by executing software instructions in a program memory accessible to the processors.

Where a component (e.g. a light source, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. In combination, an elevated work platform and an overhead hazard warning system therefor, the overhead hazard warning system comprising a projector, and the projector comprising:
    a light source configured to emit light in a downward direction;
    a first optical lens assembly, a template, and a second optical lens assembly operatively coupled together, with the light passing through the first optical lens assembly, the template, and the second optical lens assembly to produce a pattern below the elevated work platform;
    a housing with a tubular section which houses the light source, the first optical lens assembly, the template and the second optical lens assembly, the tubular section of the housing having a longitudinal axis and a diameter that is substantially constant along the longitudinal axis thereof; and
    a heat sink located above the light source, the heat sink including a heat conducting structure having a cavity located inside the heat conducting structure, the cavity being elongated in the downward direction, the cavity containing a depressurized heat transfer liquid in thermal contact with the light source, the cavity being sealed, the cavity extending along a longitudinal axis coaxial with that of the optical lens assemblies, and the heat sink including a radiating structure comprising a plurality of vertical fins, with the depressurized heat transfer liquid drawing heat radiated by the light source upwards to distribute the heat along the plurality of vertical fins, wherein distal end portions of the vertical fins vertically align with peripheral portions of the lens assemblies, and wherein the housing and the heat sink are configured such that the projector has an overall form factor that is an elongated cylinder.

2. The combination according to claim 1 wherein the radiating structure and the cavity are concentric.

3. The combination according to claim 1 wherein the plurality of vertical fins spread around a circumference of the radiating structure.

4. The combination according to claim 1 wherein one or more of: the first optical lens assembly is configured to direct the light downward in a collimated beam; and wherein the second optical lens assembly is configured to project the collimated beam downward in a diverging beam.

5. The combination according to claim 1 wherein the depressurized heat transfer liquid has a boiling point that is above 30 degrees Celsius and below 70 degrees Celsius.

6. The combination according to claim 1 wherein the depressurized heat transfer liquid is distilled water and wherein the cavity has a pressure set to a vacuum of about 35 Torr such that the boiling point of the depressurized heat transfer liquid is below 50 degrees Celsius.

7. The combination according to claim 1 wherein the heat sink comprises a thermally conductive post that extends longitudinally along the cavity, wherein one or more portions of the post are in thermal contact with the light source and wherein one or more portions of the post are in contact with the depressurized heat transfer liquid.

8. The combination according to claim 1, wherein the elevated work platform includes a basket to which the projector couples.

9. The combination according to claim 8 wherein the housing of the projector is attached to and adjacent a railing of the basket on a side of the basket to which a boom of the elevated work platform is coupled.

10. The combination according to claim 8 wherein the projector is attached on an outside of and adjacent to a railing of the basket.

11. The combination according to claim 8, including a control system connected to supply electrical power to the light source, wherein the control system is configured to perform any combination of two or more of:
    power the light source on or off in response to user input;
    cause an intensity of light from the light source to fluctuate;
    vary the brightness of light from the light source in response to changes of ambient light levels;
    power the light source off if a set period of time passes from the powering on of the light source;
    power the light source off if a set period of time passes from one or more of i) motion being detected in the basket of the elevated work platform and ii) an occupancy sensor indicating that there are no personnel in the basket of the elevated work platform;
    power the light source off in response to a wireless signal; and
    monitor operation of the overhead hazard warning system and power off the light source or generate an alarm signal if the overhead hazard warning system is not working properly.

12. The combination according to claim 8 wherein the projector is equal to or less than 1 meter in length, wherein the projector has a diameter of 15 centimeters or less, wherein a top end of the projector is below a top of a railing of the basket, and wherein a bottom end of the projector is above a bottom of the basket.

13. The combination according to claim 1 wherein one or more of: the light source emits light that is primarily one of yellow, orange or red in color; and the template comprises a yellow, orange or red color filter.

14. The combination according to claim 1, wherein the template comprises a spatial light modulator configurable to change a first said pattern to a second said pattern which is different than the first said pattern.

15. The combination according to claim 1 wherein the pattern projected by the template includes one or more of:
    a warning message that includes one or more of the words CAUTION, WORKERS ABOVE, DANGER, and HAZARD; and
    a graphical warning symbol.

16. The combination according to claim 1, wherein the optical lens assemblies are configured to collimate said light from the light source, pass the collimated said light through the template, and cause the light that has passed through the template to diverge to form a beam of said light;

wherein the projector attaches to a railing of a basket of the elevated work platform, with the projector being located below a top edge of the railing of the basket and above a bottom of the basket, and with the projector being dimensioned to fit within a cylindrical space having a diameter of 15 centimeters and a length of 1 meter;

wherein the projector is operable to project said light in the downward direction so as to project the beam of said light imprinted with the pattern downwardly from the basket of the elevated work platform;

wherein the plurality of vertical fins are thermally conductive for dissipating heat;

wherein the heat sink includes a thermally conductive member that is in thermal contact with the light source and the depressurized heat transfer liquid;

wherein the heat conducting structure is operative to carry heat away from the thermally conductive member and distribute the heat over an inner surface of the radiating structure; and wherein the cavity so sealed is partially evacuated to a pressure at which a boiling point of the depressurized heat transfer liquid is below 100 degrees Celsius and above 30 degrees Celsius.

17. In combination, an elevated work platform and an overhead hazard warning system therefor, the overhead hazard warning system comprising a projector, and the projector comprising:

a light source configured to emit light in a downward direction;

a first optical lens assembly, a template, and a second optical lens assembly operatively coupled together, with the light passing through the first optical lens assembly, the template, and the second optical lens assembly to produce a pattern below the elevated work platform;

a housing with a tubular section which houses the light source, the first optical lens assembly, the template and the second optical lens assembly, the tubular section of the housing having a longitudinal axis and a diameter that is substantially constant along the longitudinal axis thereof; and a heat sink located above the light source, the heat sink comprising a radiating structure and a cavity located inside the radiating structure, the cavity being elongated in the downward direction, the cavity containing a depressurized heat transfer liquid in thermal contact with the light source to draw heat radiated by the light source upwards to distribute the heat along the radiating structure, and the radiating structure spanning an extent substantially similar to that of the lens assemblies, and wherein the housing and the heat sink are configured such that the projector has an overall form factor that is an elongated cylinder.

18. In combination, an elevated work platform and an overhead hazard warning system therefor, the overhead warning system comprising a projector, and the projector comprising:

a light source configured to emit light in a downward direction;

a first optical lens assembly, a template, and a second optical lens assembly operatively coupled together, with the light passing through the first optical lens assembly, the template, and the second optical lens assembly to produce a pattern below the elevated work platform;

a housing with a tubular section which houses the light source, the first optical lens assembly, the template and the second optical lens assembly, the tubular section of the housing having a longitudinal axis and a diameter that is substantially constant along the longitudinal axis thereof; and a heat sink located above the light source, the heat sink comprising a radiating structure and a cavity located inside the radiating structure, the cavity being elongated in the downward direction, the cavity containing a depressurized heat transfer liquid in thermal contact with the light source to draw heat radiated by the light source upwards to distribute the heat along the radiating structure, wherein the heat sink has a length longer than a distance of separation between the first optical lens assembly and the second optical lens assembly, and wherein the housing and the heat sink are configured such that the projector has an overall form factor that is an elongated cylinder.

19. The combination as claimed in claim 18, wherein the heat sink includes a radiating structure comprising a plurality of vertical fins, with the depressurized heat transfer liquid drawing heat radiated by the light source upwards to distribute the heat along the plurality of vertical fins, and wherein distal end portions of the vertical fins vertically align with peripheral portions of the lens assemblies.

20. The combination according to claim 18, wherein the projector is configured to facilitate attachment thereof to the elevated work platform without impeding operation of the elevated work platform.

* * * * *

UNITED STATES PATENT AND TRADEMARK OFFICE
CERTIFICATE OF CORRECTION

| | |
|---|---|
| PATENT NO. | : 12,146,650 B2 |
| APPLICATION NO. | : 17/170509 |
| DATED | : November 19, 2024 |
| INVENTOR(S) | : David McIntosh and Steve M. Smith |

Page 1 of 1

It is certified that error appears in the above-identified patent and that said Letters Patent is hereby corrected as shown below:

In the Claims

Column 12, Line 21 Claim 11, should read:
11. The combination according to claim 8, including a control system connected to supply electrical power to the light source, wherein the control system is configured to perform any combination of two or more of: power the light source on or off in response to user input; cause an intensity of light from the light source to fluctuate; vary the brightness of light from the light source in response to changes of ambient light levels; power the light source off if a set period of time passes from the powering on of the light source; power the light source off if a set period of time passes from one or more of i) motion being detected in the basket of the elevated work platform or ii) an occupancy sensor indicating that there are no personnel in the basket of the elevated work platform; power the light source off in response to a wireless signal; and monitor operation of the overhead hazard warning system and power off the light source or generate an alarm signal if the overhead hazard warning system is not working properly.

Column 12, Line 49 Claim 13, should read:
13. The combination according to claim 1 wherein one or more of: the light source emits light that is primarily one of yellow, orange or red in color; or the template comprises a yellow, orange or red color filter.

Column 12, Line 57 Claim 15, should read:
15. The combination according to claim 1 wherein the pattern projected by the template includes one or more of: a warning message that includes one or more of the words CAUTION, WORKERS ABOVE, DANGER, and HAZARD; or a graphical warning symbol.

Signed and Sealed this
Twenty-fifth Day of March, 2025

Coke Morgan Stewart
*Acting Director of the United States Patent and Trademark Office*